United States Patent [19]
Harnish et al.

[11] 3,887,047
[45] June 3, 1975

[54] AUTOMATIC BRAKE ADJUSTER AND RESET HAVING EXTENSIONABLE FEATURE

[75] Inventors: Eugene E. Harnish; Richard F. Horner, both of South Bend, Ind.

[73] Assignee: The Bendix Corporation, South Bend, Ind.

[22] Filed: Aug. 9, 1973

[21] Appl. No.: 387,093

[52] U.S. Cl............. 188/196 R; 188/1 C; 188/71.8; 192/70.25; 192/111 A
[51] Int. Cl............................................. F16d 65/54
[58] Field of Search ........... 188/71.8, 196 R, 196 P, 188/1 C; 192/70.25, 111 A

[56] References Cited
UNITED STATES PATENTS
3,376,959  4/1968  Holcomb, Jr. et al. ......... 188/196 R Primary Examiner—George E. A. Halvosa
Attorney, Agent, or Firm—Gordon H. Chenez; William N. Antonis

[57] ABSTRACT

A brake adjuster and reset particularly adapted for multiple disc aircraft disc brakes and provided with first and second concentric deformable tube members the first of which tube members is deformed radially outwardly by a circular member fixedly secured to and pulled axially through the first tube member by a piston actuated brake applying pressure plate to provide a first range of adjusted brake positions and the second of which tube members is deformed radially outwardly by an annular member secured to and pulled axially through the second tube member by the first tube member to provide a second range of adjustment of the brake. A first stop member is engaged by the second tube member in a brake applying direction and a spring bearing against the second tube member urges the same off the first stop member into engagement with a second fixed stop member spaced from the first stop member when the brake is released to establish a predetermined brake reset or running clearance.

7 Claims, 2 Drawing Figures

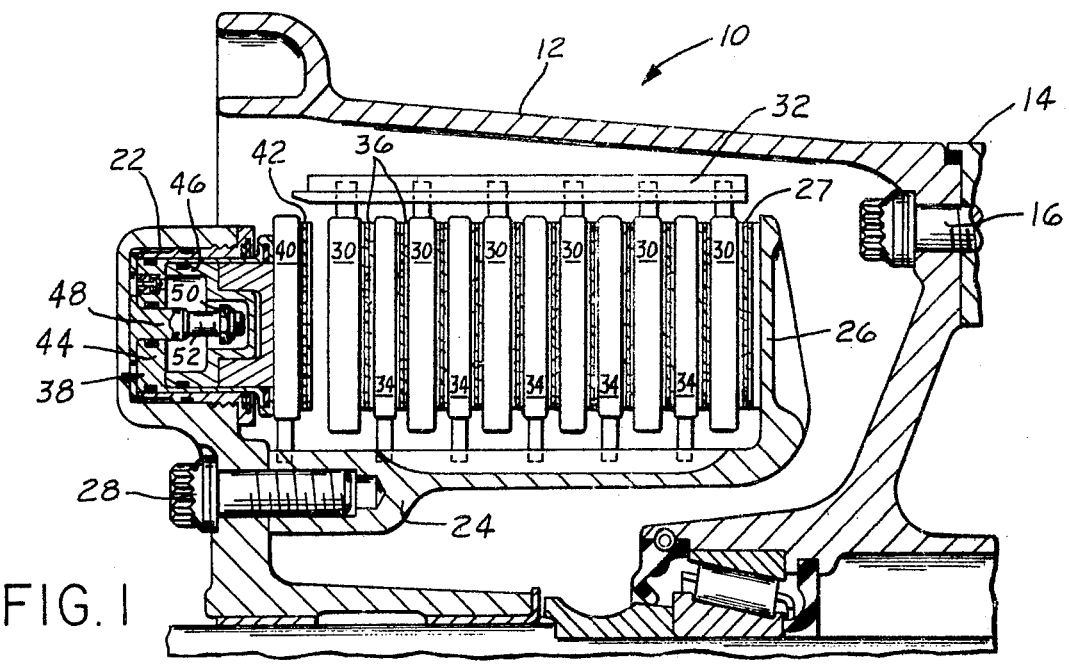
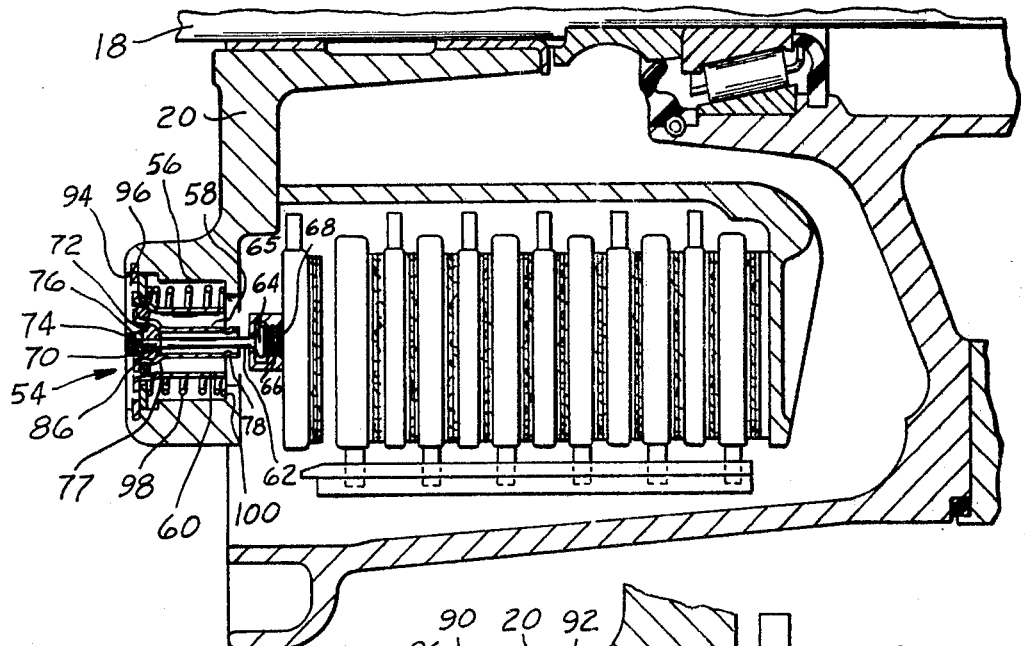
FIG. 1
FIG. 2
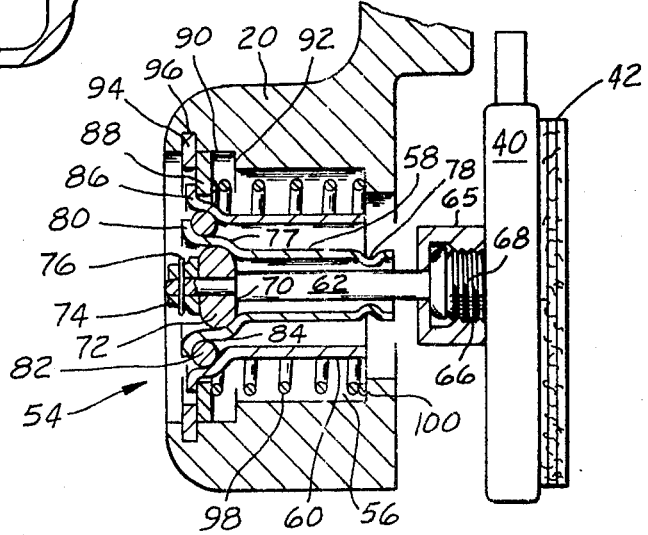

3,887,047

AUTOMATIC BRAKE ADJUSTER AND RESET HAVING EXTENSIONABLE FEATURE

BACKGROUND OF THE INVENTION

Automatic brake adjusting and reset apparatus for multiple disc aircraft disc brakes are well known and have taken various forms most of which perform satisfactorily in the brake environment for which they are designed. For example, reference is made to U.S. Pat. No. 3,376,959 in the name of O. L. Holcomb, Jr. et al, and entitled "Automatic Brake Adjuster Mechanism". However, in response to demand for lighter, longer life and/or higher capacity disc brakes, aircraft disc brakes have undergone design changes wherein the range of adjustment of the brake has increased and the housing structure which supports the fluid pressure responsive brake actuating pistons as well as the automatic adjustment apparatus is not sufficiently thick in the direction of movement of the automatic adjuster as well as the brake actuating pistons to provide the degree of movement necessary to compensate for the expected wear of the friction discs of the brake. The range of travel of the brake actuating pistons has been suitably extended to provide the desired range of travel by making each piston of the extensionable type as disclosed in U.S. Pat. No. 3,789,738 issued Feb. 5, 1974 in the name Richard F. Horner. The present invention is particularly adapted for use with a disc brake incorporating the above-mentioned extensionable piston.

SUMMARY OF THE INVENTION

The present invention provides a disc brake automatic adjuster and reset device of the deformable tube type wherein the range of axial adjustment of a brake provided by the deformable tube may be substantially increased without increasing the length of the deformable tube.

It is an object of the present invention to provide a compact brake adjuster and reset device having a relatively large range of adjustment for a multiple-disc disc brake.

It is another object of the present invention to provide a multiple-disc disc brake adjuster and reset device of the deformable tube type having a plurality of telescoping tubular members which are deformed in sequence to provide a range of axial adjustment of the brake in excess of the length of any one of said plurality of tubular members.

BRIEF DESCRIPTION OF THE DRAWINGS

FIG. 1 represents a schematic sectional view of a multiple-disc aircraft disc brake embodying the present invention.

FIG. 2 represents a schematic sectional view of the present invention shown removed from the brake structure of FIG. 1.

DESCRIPTION OF THE PREFERRED EMBODIMENT

Referring to FIG. 1, numeral 10 designates an aircraft wheel and multiple-disc disc brake therefor. The wheel and brake is conventional and includes two annular wheel sections 12 and 14, only one of which is fully shown, fastened together by circumferentially spaced-apart bolts and nuts generally indicated by 16. The wheel is suitably journaled on a rotatably fixed axle 18 carried by conventional aircraft landing gear structure, not shown. An annular brake carrier 20 suitably keyed to axle 18 is provided with a plurality of circumferentially spaced-apart cavities 22, only one of which is shown, vented to a source of pressurized fluid, not shown, controlled by the aircraft pilot. A torque tube 24 having an integral backing plate 26 suitably lined with friction material 27 is fixedly secured to brake carrier 20 by a plurality of circumferentially spaced-apart bolts 28. A plurality of spaced-apart annular brake rotor members 30 are suitably keyed to a retaining member 32 fixedly secured to wheel section 12 and adapted to permit axial movement of the rotor members 30 relative to wheel section 12. A plurality of annular brake stator members 34 having friction lining 36 secured to opposite faces thereof are suitably keyed for axial movement to torque tube 24.

The cavities 22 are each provided with piston means generally indicated by 38 which are pressurized and urged axially into engagement with an annular pressure plate 40 which, in turn, compresses the rotor and stator members 30 and 34 together against the resistance of backing plate 26 to retard rotation of rotor members 30 and thus the wheel attached thereto. The pressure plate 40, like backing plate 26, is lined with friction material 42.

It will be recognized that the piston means 38 is necessarily confined in a limited space and must have an axial travel range sufficient to compensate for the accumulative axial wear of the friction linings 27, 36 and 42 over a period of brake use. Reference is made to the above-mentioned U.S. Pat. No. 3,789,738 for a detailed disclosure of the structure and operation of the piston means 38. For the purpose of the present discussion, it is sufficient to understand that the piston means 38 is made in two piston sections 44 and 46. The piston section 44 is slidably carried on a fixed post 48 having a stop 50 which is engaged by piston section 44 to limit the axial travel of the latter in response to pressurization of cavity 22. The piston section 46 is slidably carried by piston section 44 and pressurized by fluid passing between a reduced diameter section 52 of post 48 and piston section 44 when the latter engages stop 50 thereby pressurizing piston section 46 which moves axially relative to piston section 44. Thus, the available range of movement of piston means 38 is the travel of piston section 44 as limited by stop 50 plus the subsequent travel of piston section 46 depending upon the extent of wear of the friction lining 36 and 42.

The axial movement of pressure plate 40 actuated by piston sections 44 and 46 to compress the rotor and stator members 30 and 34 together is a direct indication of the wear status of the friction lining 26, 36 and 42 and may be adjusted to compensate for wear of the same.

To that end, the present invention comprising brake adjusting and reset apparatus is connected to the pressure plate 40 to progressively advance the same axially as wear occurs and retract the pressure plate 40 a predetermined distance upon release of the piston means 38 to provide a constant running clearance when the brake is released. A plurality of brake adjusting and reset devices generally indicated by 54, only one of which is shown, are contained in axially extending openings 56 in brake carrier 20 in circumferentially spaced-apart relationship. Each adjusting and reset device includes inner and outer tubular members 58 and 60, respectively, concentrically arranged in opening 56. A rod 62 extends axially through inner tubular member 58 and is provided with an enlarged diameter end portion 64. A cap 65 having a central opening 66 through which rod 62 extends bears against end portion 64 and is provided with a threaded portion which threadedly engages a threaded raised portion 68 of pressure plate 40 thereby securing the pressure plate 40 and rod 62 together. The opposite end of rod 62 is provided with a reduced diameter section defining a shoulder 70 against which an annular doughnut-shaped member or button 72 bears. A nut 74 threadedly engaged with rod 62 bears against button 72 to fixedly secure the same in position on rod 62. A pin 76 suitably extending through nut 74 and rod 62 secures the nut in position. The inner tubular member 58 may be preformed at one end as at 77 to accommodate button 72 thereby providing a starting position from which button 72 is actuated axially through tubular member 58 as will be described. The opposite end of inner tubular member 58 is provided with a radially inwardly deformed portion or annular crimp 78 which serves as a stop for button 72 to limit axial movement thereof through tubular member 58 as will be described.

A radially outwardly extending flange 80 formed on tubular member 58 bears against a torus-shaped ring 82 which, in turn, bears against a radially outwardly deformed portion 84 of outer tubular member 60. The outer tubular member 60 is flared outwardly to provide an annular flange 86 which bears against an annular retaining member 88 which is slidably carried in an annular recess 90 formed in the wall of cavity 22 and engageable with a first fixed stop defined by a shoulder 92 at one end of recess 90 or a second fixed stop defined by a snap ring 94 received in a recess 96 in the wall of recess 90 in axially spaced-apart relationship to shoulder 92. The retaining member 88 is urged against snap ring 94 by a compression spring 98 interposed between retaining member 88 and an annular spring seat or shoulder 100. It may be desired to eliminate the annular retaining member 88 in which case the annular flange 86 would be extended radially outwardly to enable it to engage stops 92 and 94 as well as retain spring 98.

The button 72 and ring 82 are adapted to be pulled axially through inner and outer tubular members 58 and 60, respectively, thereby deforming the same radially outwardly as will be described. It will be recognized that the force required to pull the button 72 through inner tubular member 58 or ring 82 through outer tubular member 60 depends upon the degree of expansion imposed on tubular members 58 and 60 as well as the material from which the tubular members 58 and 60 are made. The button 72 and ring 82 are suitably shaped to minimize the frictional effect associated therewith by minimizing the amount of material at maximum stress level of tubular members 58 and 60. The tubular members 58 and 60 may be formed of any suitable deformable material such as aluminum, nickel, copper and the like. The inner walls of tubular members 58 and 60 may be coated with Teflon or similar material to reduce the frictional resistance to movement button 72 and ring 82 through tubular members 58 and 60, respectively.

The multiple disc brake is actuated by introducing pressurized fluid to piston means 38 which, in turn, actuate pressure plate 42 against the resistance of springs 98 to compress rotor and stator members 30 and 44 together thereby retarding wheel rotation. The inner and outer tubular members 58 and 60 being connected to pressure plate 42 via rod 62, button 72 and ring 82 are displaced axially causing retaining member 88 to move against the resistance of springs 98 into engagement with shoulder 92 at which position it will be assumed the rotor and stator members 30 and 44 are fully engaged. The brake is released by depressurizing piston means 38 which allows springs 98 to bias pressure plate 42 away from rotor and stator members 30 and 44 thereby disengaging the latter. The retracted position of pressure plate 42 is established by snap ring 94 against which the retaining member 88 is urged by spring 98.

Now assuming that the friction linings 27, 36 and 43 have experienced sufficient wear to require adjustment of the brake, actuation of the brake in response to pressurization of piston means 38 results in the heretofore mentioned movement of tubular members 58 and 60. However, upon engagement of retaining member 88 with shoulder 92, the tubular members 58 and 60 will be held fixed and the pressure plate 42 will continue to move under the influence of piston means 38 until the rotor and stator members 30 and 44 are fully engaged. The button 72 being fixed to pressure plate 42 via rod 62 is pulled axially through inner tubular member 58 thereby deforming the latter radially outwardly as the button 72 moves to the extent dictated by pressure plate 42 whereupon button 72 is frictionally secured in position relative to tubular member 58.

Upon depressurization of the piston means 38, the pressure plate 42 and tubular members 58 and 60 connected thereby are retracted under the influence of springs 98 to the extent established by engagement of retaining member 88 with snap ring 94 thereby providing the heretofore mentioned brake running clearance.

As wear of the linings 27, 36 and 43 progresses, an application of the brake results in axial displacement of button 72 through tubular member 58 in the above-mentioned manner until the button 72 engages annular crimp 78 whereupon further movement of button 72 relative to tubular member 58 is prevented. Further compensation for wear of the linings 27, 36 and 43 is provided by outer tubular member 60 which is deformed radially outwardly by ring 82 which is drawn axially therethrough by inner tubular member 58 which follows pressure plate 42. As in the case of button 72 and inner tubular member 58, the ring 82 is frictionally secured in any given position in outer tubular member 60 such that, upon depressurization of piston means 38, the pressure plate 42 will be retracted to the extent permitted by engagement of retaining member 88 with snap ring 94. It will be understood that the outer tubular member 60 may be crimped at one end, not shown, in the same manner as inner tubular member 58 to prevent ring 82 from being pulled out of tubular member 60. However, the total range of adjustment afforded by tubular members 58 and 60 should be more than adequate to compensate for the usual maximum permitted wear condition of linings 27, 36 and 43 such that the ring 82 will not traverse the total length of outer tubular member 60.

We claim:

1. Automatic brake adjusting and reset apparatus for a multiple disc disc brake having an axially movable fluid pressure actuated pressure plate for applying the brake comprising:

an annular housing provided with a plurality of circumferentially spaced-apart cavities;

a first radially deformable tubular member disposed in each of said cavities and provided with a stop member adjacent one end thereof;

a second radially deformable tubular member coaxial with said first tubular member and adapted to telescope relative thereto;

a support member fixedly secured to said pressure plate and extending therefrom into each of said cavities;

a first deforming member fixedly secured to said support member and frictionally engaged with said first tubular member for deforming the same in response to axial movement thereof;

a second deforming member interposed between said first and second tubular members and frictionally engaged with said second tubular member for deforming the same in response to axial movement therethrough;

first and second spaced-apart fixed stop means engageable with said second tubular member and defining brake released and brake applied positions thereof;

resilient means operatively connected to said second tubular member for urging the same into engagement with said first stop means;

said first and second tubular members being actuated by said pressure plate in response to pressurization of the latter to apply the brake;

said second tubular member engaging said second stop means to prevent subsequent movement of said first and second tubular members whereupon said first deforming member is urged axially through said first tubular member to the extent permitted by said stop member to progressively compensate for wear of the frictional surfaces of said multiple discs;

said second deforming member being urged axially through said second tubular member by said first tubular member following engagement of said first deforming member with said stop member to extend the range of adjustment of said pressure plate beyond that provided by said first tubular member;

said resilient means urging said second tubular member off said second stop means into engagement with said first stop means to thereby establish a predetermined brake running clearance upon depressurization of said pressure plate and release of said brake.

2. Automatic brake adjusting and reset apparatus as claimed in claim 1, wherein:

said support member is a rod extending axially through said first tubular member; and said first deforming member is doughnut-shaped and engageable with the inner wall of said first tubular member which is deformed radially outwardly to frictionally grip said first deforming member.

3. Automatic brake adjusting and reset apparatus as claimed in claim 2 wherein:

said first tubular member is surrounded by said second tubular member; and said second deforming member is torus-shaped and engaged by a radially outwardly extending flange formed on said first tubular member.

4. Automatic brake adjusting and reset apparatus as claimed in claim 2 wherein:

said stop member is defined by an annular crimped portion formed on said first tubular member and extending radially inwardly therefrom.

5. Automatic brake adjusting and reset apparatus as claimed in claim 1 and further including:

an annular recess formed in the wall of each of said cavities and having a radially extending annular shoulder at one end thereof defining said second stop means:

said first stop means being defined by an annular snap ring removably secured to the wall of each of said cavities;

an annular retaining member slidably received by said annular recess and engaged by said resilient means which urges said annular retaining member into engagement with said annular snap ring;

said second tubular member being provided with a radially outwardly extending annular flange portion engageable with said annular snap ring.

6. Automatic brake adjusting and reset apparatus as claimed in claim 1 wherein:

said resilient means is a compression spring coaxial with said first and second tubular members and surrounding the same.

7. Automatic brake adjusting and reset apparatus as claimed in claim 1 wherein:

said first and second deforming members are frictionally secured in any given position in said first and second tubular members, respectively.

* * * * *